US012114411B2

(12) United States Patent
Chen et al.

(10) Patent No.: US 12,114,411 B2
(45) Date of Patent: *Oct. 8, 2024

(54) APPARATUS AND METHOD FOR GENERATING EXTREME ULTRAVIOLET RADIATION

(71) Applicant: TAIWAN SEMICONDUCTOR MANUFACTURING COMPANY, LTD., Hsinchu (TW)

(72) Inventors: Yu-Huan Chen, Hsinchu (TW); Yu-Chih Huang, Hsinchu (TW); Ming-Hsun Tsai, Hsinchu (TW); Shang-Chieh Chien, New Taipei (TW); Heng-Hsin Liu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,039

(22) Filed: Mar. 6, 2023

(65) Prior Publication Data

US 2023/0225039 A1 Jul. 13, 2023

Related U.S. Application Data

(63) Continuation of application No. 17/460,108, filed on Aug. 27, 2021, now Pat. No. 11,602,037.

(51) Int. Cl.
*H05G 2/00* (2006.01)

(52) U.S. Cl.
CPC ............. *H05G 2/006* (2013.01); *H05G 2/008* (2013.01)

(58) Field of Classification Search
CPC ............................... H05G 2/006; H05G 2/008
See application file for complete search history.

(56) References Cited

U.S. PATENT DOCUMENTS

| | | | | |
|---|---|---|---|---|
| 8,796,666 | B1 | 8/2014 | Huang et al. | |
| 9,093,530 | B2 | 7/2015 | Huang et al. | |
| 9,184,054 | B1 | 11/2015 | Huang et al. | |
| 9,256,123 | B2 | 2/2016 | Shih et al. | |
| 9,529,268 | B2 | 12/2016 | Chang et al. | |
| 9,548,303 | B2 | 1/2017 | Lee et al. | |
| 9,618,837 | B2 | 4/2017 | Lu et al. | |
| 9,869,928 | B2 | 1/2018 | Huang et al. | |
| 9,869,934 | B2 | 1/2018 | Huang et al. | |
| 9,869,939 | B2 | 1/2018 | Yu et al. | |
| 11,602,037 | B1 * | 3/2023 | Chen | H05G 2/008 |
| 2017/0231075 | A1 * | 8/2017 | Umeda | H05G 2/006 |

* cited by examiner

*Primary Examiner* — Nicole M Ippolito
*Assistant Examiner* — Hanway Chang
(74) *Attorney, Agent, or Firm* — STUDEBAKER & BRACKETT PC

(57) ABSTRACT

A target droplet source for an extreme ultraviolet (EUV) source includes a droplet generator configured to generate target droplets of a given material. The droplet generator includes a nozzle configured to supply the target droplets in a space enclosed by a chamber. In some embodiments, a nozzle tube is arranged within the nozzle of the droplet generator, and the nozzle tube includes a structured nozzle pattern configured to provide an angular momentum to the target droplets.

20 Claims, 9 Drawing Sheets

APPARATUS AND METHOD FOR GENERATING EXTREME ULTRAVIOLET RADIATION

RELATED APPLICATIONS

This application is a continuation of U.S. patent application Ser. No. 17/460,108 filed Aug. 27, 2021, the entire content of which is incorporated herein by reference.

BACKGROUND

When a high-power laser beam is focused on small tin droplet targets to form highly ionized plasma that emits extreme ultraviolet (EUV) radiation, the intensity of the emitted EUV radiation depends on the effectiveness of the EUV radiation source. In some cases, bubbles and/or contaminant particles may be inside a droplet generator, which changes the trajectory of the target droplet causing a laser pulse to partially miss the target droplet. In addition, vessel flow varies depends on the temperature of a vessel and shock wave of the plasma, which changes a lot during the exposure. As a consequence, some of the target droplet may be inadequately converted to plasma and may be scattered around the vessel as debris resulting in accumulation of the tin (Sn) particles on various surfaces including a collector mirror. There is a need to increase the effectiveness of EUV radiation source by providing stability to the droplet generator and preventing bubbles and/or contaminant particles inside the droplet generator.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
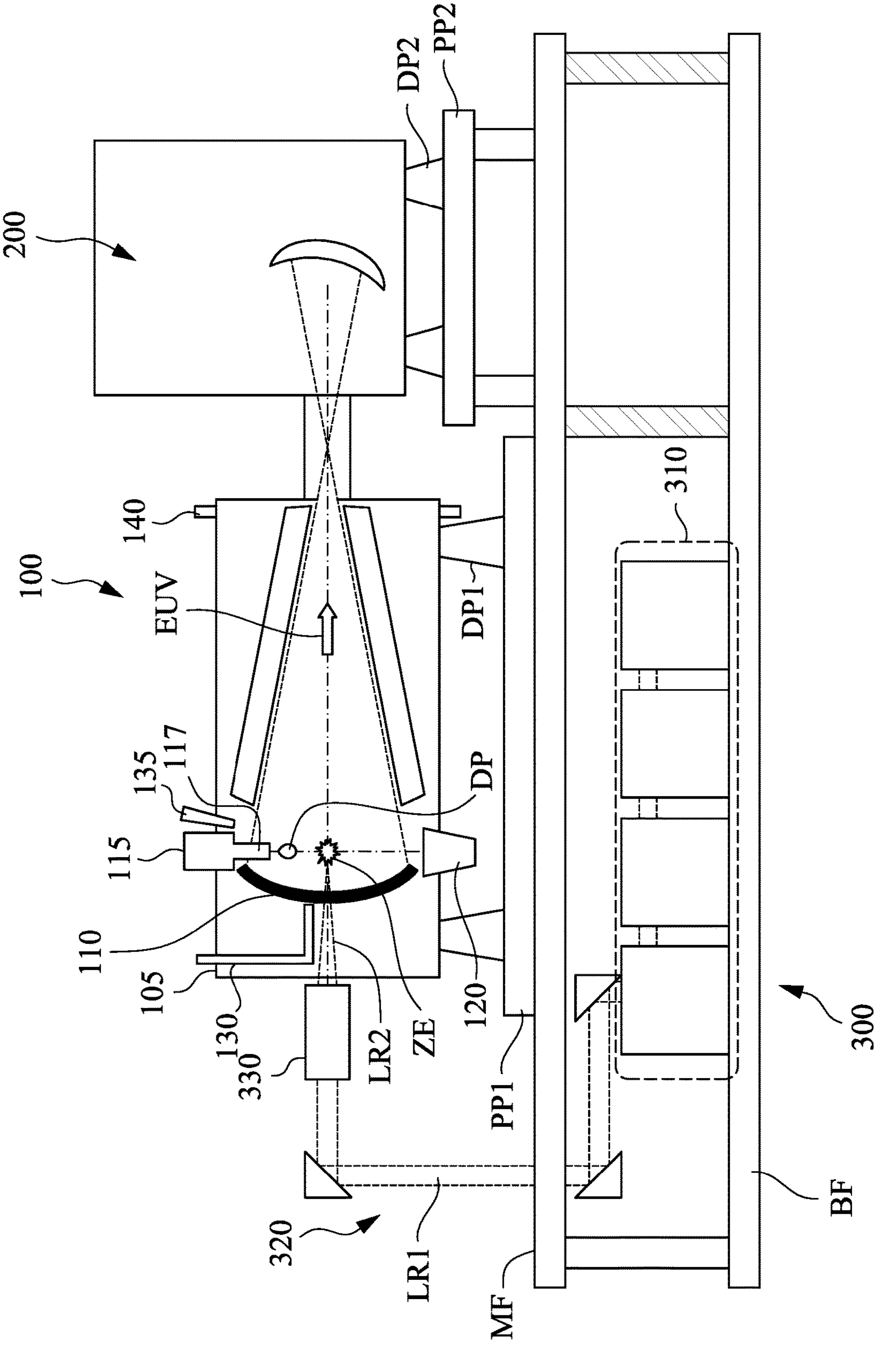
FIG. 1 is a schematic view of an EUV lithography system with a laser production plasma (LPP) EUV radiation source, constructed in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus/device may be otherwise oriented (rotated 90 degrees or at other orientations) and the spatially relative descriptors used herein may likewise be interpreted accordingly. In addition, the term "made of" may mean either "comprising" or "consisting of."

The present disclosure is generally related to extreme ultraviolet (EUV) lithography systems and methods. More particularly, it is related to apparatuses and methods for producing target droplets used in a laser produced plasma (LPP) based EUV radiation source. In an LPP based EUV radiation source, an excitation laser heats metal (e.g., tin, lithium, etc.) target droplets in the LPP chamber to ionize the droplets to plasma, which emits the EUV radiation. For reproducible generation of EUV radiation, the target droplets arriving at the focal point (also referred to herein as the "zone of excitation") have to be substantially the same size and arrive at the zone of excitation at the same time as an excitation pulse from the excitation laser arrives. Thus, stable generation of target droplets that travel from the target droplet generator to the zone of excitation at a uniform (or predictable) speed contributes to efficiency and stability of the LPP EUV radiation source. One of the objectives of the present disclosure is directed to generating target droplets and providing a path along which the target droplets can travel at a uniform speed and without a change in their size or shape.

FIG. 1 is a schematic view of an EUV lithography system with a laser production plasma (LPP) based EUV radiation source, constructed in accordance with some embodiments of the present disclosure. The EUV lithography system includes an EUV radiation source 100 to generate EUV radiation, an exposure tool 200, such as a scanner, and an excitation laser source 300. As shown in FIG. 1, in some embodiments, the EUV radiation source 100 and the exposure tool 200 are installed on a main floor MF of a clean room, while the excitation laser source 300 is installed in a base floor BF located under the main floor. Each of the EUV radiation source 100 and the exposure tool 200 are placed over pedestal plates PP1 and PP2 via dampers DP1 and DP2, respectively. The EUV radiation source 100 and the exposure tool 200 are coupled to each other by a coupling mechanism, which may include a focusing unit.

The lithography system is an EUV lithography system designed to expose a resist layer by EUV light (also interchangeably referred to herein as EUV radiation). The resist layer is a material sensitive to the EUV light. The EUV lithography system employs the EUV radiation source 100 to generate EUV light, such as EUV light having a wavelength ranging between about 1 nm and about 100 nm. In one particular example, the EUV radiation source 100 generates EUV light with a wavelength centered at about 13.5 nm. In the present embodiment, the EUV radiation source 100 utilizes a mechanism of laser-produced plasma (LPP) to generate the EUV radiation.

The exposure tool 200 includes various reflective optic components, such as convex/concave/flat mirrors, a mask holding mechanism including a mask stage, and wafer holding mechanism. The EUV radiation EUV generated by the EUV radiation source 100 is guided by the reflective optical components onto a mask secured on the mask stage. In some embodiments, the mask stage includes an electrostatic chuck (e-chuck) to secure the mask. Because gas molecules absorb EUV light, the lithography system for the EUV lithography patterning is maintained in a vacuum or a-low pressure environment to avoid EUV intensity loss.

In the present disclosure, the terms mask, photomask, and reticle are used interchangeably. In the present embodiment, the mask is a reflective mask. In an embodiment, the mask includes a substrate with a suitable material, such as a low thermal expansion material or fused quartz. In various examples, the material includes $TiO_2$ doped $SiO_2$, or other suitable materials with low thermal expansion. The mask includes multiple reflective multiple layers (ML) deposited on the substrate. The ML includes a plurality of film pairs, such as molybdenum-silicon (Mo/Si) film pairs (e.g., a layer of molybdenum above or below a layer of silicon in each film pair). Alternatively, the ML may include molybdenum-beryllium (Mo/Be) film pairs, or other suitable materials that are configured to highly reflect the EUV light. The mask may further include a capping layer, such as ruthenium (Ru), disposed on the ML for protection. The mask further includes an absorption layer, such as a tantalum boron nitride (TaBN) layer, deposited over the ML. The absorption layer is patterned to define a layer of an integrated circuit (IC). Alternatively, another reflective layer may be deposited over the ML and is patterned to define a layer of an integrated circuit, thereby forming an EUV phase shift mask.

The exposure tool 200 includes a projection optics module for imaging the pattern of the mask on to a semiconductor substrate with a resist coated thereon secured on a substrate stage of the exposure tool 200. The projection optics module generally includes reflective optics. The EUV radiation (EUV light) directed from the mask, carrying the image of the pattern defined on the mask, is collected by the projection optics module, thereby forming an image onto the resist.

In various embodiments of the present disclosure, the semiconductor substrate is a semiconductor wafer, such as a silicon wafer or other type of wafer to be patterned. The semiconductor substrate is coated with a resist layer sensitive to the EUV light in presently disclosed embodiments. Various components including those described above are integrated together and are operable to perform lithography exposing processes.

The lithography system may further include other modules or be integrated with (or be coupled with) other modules.

As shown in FIG. 1, the EUV radiation source 100 includes a target droplet generator 115 and a LPP collector 110, enclosed by a chamber 105. In various embodiments, the target droplet generator 115 includes a reservoir (shown in FIG. 2) to hold a source material and a nozzle 117 through which target droplets DP of the source material are supplied into the chamber 105.

In some embodiments, the target droplets DP are droplets of tin (Sn), lithium (Li), or an alloy of Sn and Li. In some embodiments, the target droplets DP each have a diameter in a range from about 10 microns (μm) to about 100 μm. For example, in an embodiment, the target droplets DP are tin droplets, each having a diameter of about 10 μm, about 25 μm, about 50 μm, or any diameter between these values. In an embodiment, the target droplets DP are supplied through the nozzle 117 at a rate in a range from about 50 droplets per second (i.e., an ejection-frequency of about 50 Hz) to about 50,000 droplets per second (i.e., an ejection-frequency of about 50 kHz). For example, in some embodiments, target droplets DP are supplied at an ejection-frequency of about 50 Hz, about 100 Hz, about 500 Hz, about 1 kHz, about 10 kHz, about 25 kHz, about 50 kHz, or any ejection-frequency between these frequencies. The target droplets DP are ejected through the nozzle 117 and into a zone of excitation ZE at a speed in a range of about 10 meters per second (m/s) to about 100 m/s in various embodiments. For example, in an embodiment, the target droplets DP have a speed of about 10 m/s, about 25 m/s, about 50 m/s, about 75 m/s, about 100 m/s, or at any speed between these speeds.

In various embodiments, the nozzle 117 is maintained at a certain temperature that is usually higher than the melting point of the source material. However, under certain conditions such as, for example, if the chamber 105 is to be vented for a service or if there is an unscheduled change in temperature of the chamber 105, temperature of the nozzle 117 is reduced to below the melting point of the source material, e.g., tin. When the nozzle 117 cools down, there is a higher likelihood of leakage of the liquid source material through the nozzle because of possible particulate formation at the nozzle 117. Moreover, such leaked source material typically is deposited on the collector 110 resulting in reduction in the reflectivity of the collector 110. This in turn results in the loss of stability and efficiency of the EUV radiation source 100. In some cases, replacement of the collector 110 may be required, leading to unnecessary and avoidable expense as well as downtime for the entire lithography system.

Referring back to FIG. 1, the excitation laser light LR2 generated by the excitation laser source 300 is pulsed light. The excitation laser source 300 may include a laser generator 310, laser guide optics 320 and a focusing apparatus 330. In some embodiments, the laser source 310 includes a carbon dioxide ($CO_2$) or a neodymium-doped yttrium aluminum garnet (Nd:YAG) laser source with a wavelength in the infrared region of the electromagnetic spectrum. For example, the laser source 310 has a wavelength of 9.4 μm or 10.6 μm, in an embodiment. The laser light LR1 generated by the laser generator 300 is guided by the laser guide optics 320 and focused into the excitation laser LR2 by the focusing apparatus 330, and then introduced into the EUV radiation source chamber 105.

In some embodiments, the excitation laser LR2 includes a pre-heat laser and a main laser. In such embodiments, the pre-heat laser pulse (interchangeably referred to herein as the "pre-pulse) is used to heat (or pre-heat) a given target droplet to create a low-density target plume with multiple smaller droplets, which is subsequently heated (or reheated) by a pulse from the main laser, generating increased emission of EUV light.

In various embodiments, the pre-heat laser pulses have a spot size about 100 μm or less, and the main laser pulses have a spot size in a range of about 150 μm to about 300 μm. In some embodiments, the pre-heat laser and the main laser pulses have a pulse-duration in the range from about 10 ns to about 50 ns, and a pulse-frequency in the range from about 1 kHz to about 100 kHz. In various embodiments, the pre-heat laser and the main laser have an average power in the range from about 1 kilowatt (kW) to about 50 kW. The pulse-frequency of the excitation laser LR2 is matched with the ejection-frequency of the target droplets DP in an embodiment.

The laser light LR2 is directed through windows (or lenses) into the zone of excitation ZE. The windows adopt a suitable material substantially transparent to the laser beams. The generation of the pulse lasers is synchronized with the ejection of the target droplets DP through the nozzle 117. As the target droplets move through the excitation zone, the pre-pulses heat the target droplets and transform them into low-density target plumes. A delay between the pre-pulse and the main pulse is controlled to allow the target plume to form and to expand to an optimal size and geometry. In various embodiments, the pre-pulse and the main pulse have the same pulse-duration and peak power. When the main pulse heats the target plume, a high-temperature plasma is generated. The plasma emits EUV radiation EUV, which is collected by the collector mirror 110. The collector 110 further reflects and focuses the EUV radiation for the lithography exposing processes performed by the exposure tool 200. The droplet catcher 120 is used for catching excess target droplets. For example, some target droplets may be purposely missed by the laser pulses.

The high-temperature plasma generated when a target droplet is hit with the main pulse exerts a high outward pressure. The next target droplet must travel through a strong wind of plasma generated by the previous target droplet. Without wishing to be bound by theory, the momentum given by the plasma to the next target droplet is given by $$mV_{exp}SLn_o(r_o/L)^3=(3/4\pi)MV_{exp}S/L^2 \quad \text{Expression (1).}$$

Where the plasma is assumed to have a uniform density profile with the initial density and radius being denoted by $n_o$ and $r_o$ respectively, m and $V_{exp}$ are the mass and expansion velocity of ions in the plasma, S is the cross-section of the travelling droplet, L is the separation between the successive droplets, and M is the mass the target droplet hit by the main pulse. In an embodiment, $V_{exp}$ for the plasma is about $3.5\times10^4$ m/s, and $r_o$ is about 15 μm. In various embodiments, L is in a range from about 0.5 mm to about 3 mm depending on the ejection frequency and speed of the target droplets.

Referring back to FIG. 1, the collector 110 is designed with a proper coating material and shape to function as a mirror for EUV collection, reflection, and focusing. In some embodiments, the collector 110 is designed to have an ellipsoidal geometry. In some embodiments, the coating material of the collector 100 is similar to the reflective multilayer of the EUV mask. In some examples, the coating material of the collector 110 includes a ML (such as a plurality of Mo/Si film pairs) and may further include a capping layer (such as Ru) coated on the ML to substantially reflect the EUV light. In some embodiments, the collector 110 further includes a grating structure designed to effectively scatter the laser beam directed onto the collector 110. For example, a silicon nitride layer is coated on the collector 110 and is patterned to have a grating pattern.

In such an EUV radiation source, the plasma caused by the laser application creates physical debris, such as ions, gases and atoms of the droplet, as well as the desired EUV radiation. It is necessary to prevent the accumulation of material on the collector 110 and also to prevent physical debris exiting the chamber 105 and entering the exposure tool 200.

As shown in FIG. 1, in the present embodiment, a buffer gas is supplied from a first buffer gas supply 130 through the aperture in collector 110 by which the pulse laser is delivered to the tin droplets. In some embodiments, the buffer gas is $H_2$, He, Ar, N or another inert gas. In certain embodiments, $H_2$ is used as H radicals generated by ionization of the buffer gas can be used for cleaning purposes. The buffer gas can also be provided through one or more second buffer gas supplies 135 toward the collector 110 and/or around the edges of the collector 110. Further, the chamber 105 includes one or more gas outlets 140 so that the buffer gas is exhausted outside the chamber 105.

Hydrogen gas has low absorption to the EUV radiation. Hydrogen gas reaching to the coating surface of the collector 110 reacts chemically with a metal of the droplet forming a hydride, e.g., metal hydride. When tin (Sn) is used as the droplet, stannane ($SnH_4$), which is a gaseous byproduct of the EUV generation process, is formed. The gaseous $SnH_4$ is then pumped out through the outlet 140.

The combination of the pressure exerted by the plasma flow and the flow of the buffer (e.g., $H_2$) gas in the chamber 105 alters the path of target droplets following the target droplet that produced the plasma. Any alteration in the path of target droplets in results inefficient heating of the target droplets which may adversely affect the performance of the EUV radiation source. Other potential effects of alteration in the path of target droplets include, but are not limited to, deposition of debris on the collector mirror and contamination of the exposure tool.

Figure 2:
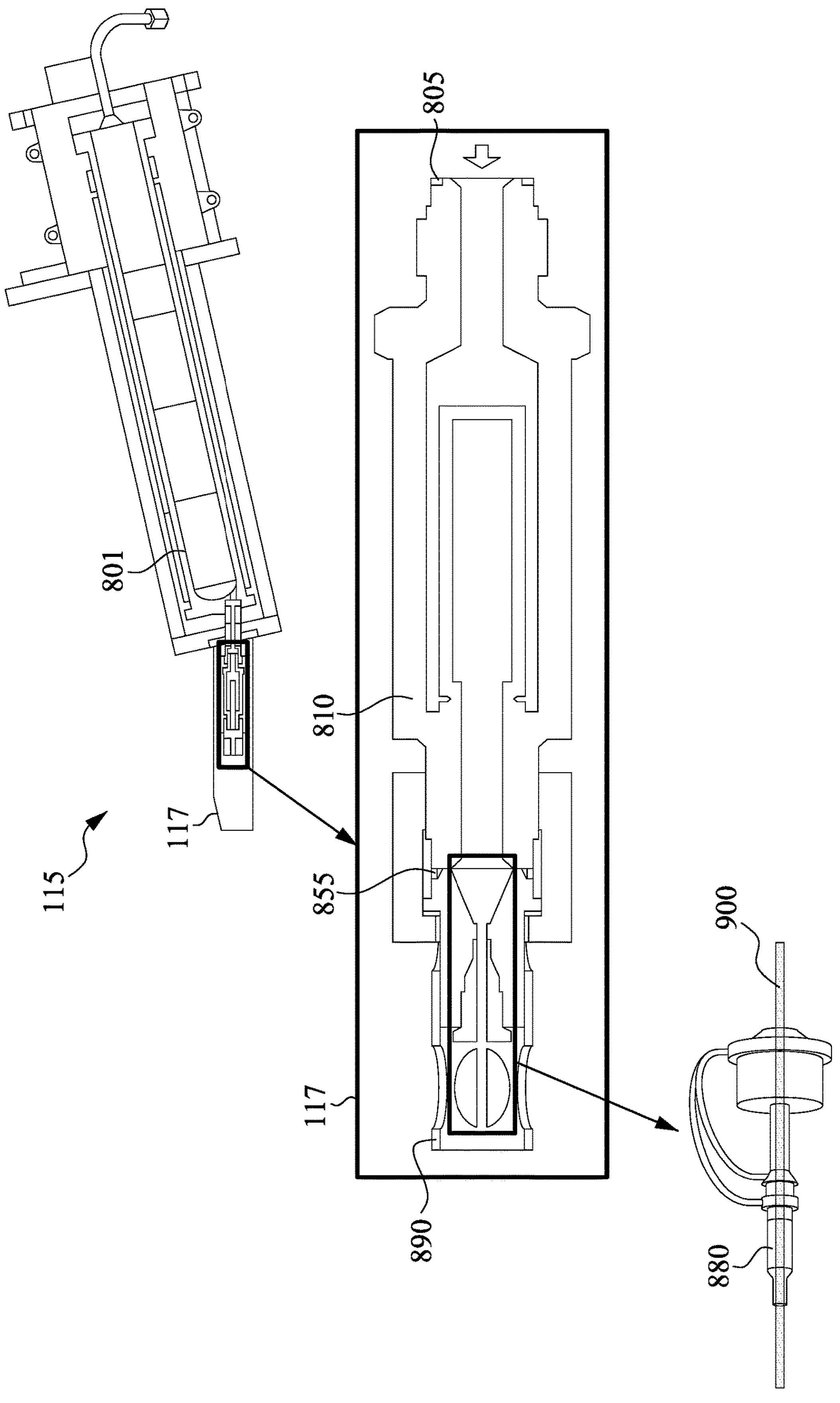
FIG. 2 is a schematic view of a target droplet generator in accordance with an embodiment of the present disclosure.

FIG. 2 is a schematic view of a target droplet generator in accordance with an embodiment of the present disclosure. In some embodiments, the target droplet generator 115 includes a reservoir 801 to hold a source material and the nozzle 117 through which target droplets are supplied into the chamber 105 shown in FIG. 1. The target droplet material (e.g., tin) stored in the reservoir 801 flows through a source material filter 810 before it gets to the nozzle 117. In some embodiments, the source material filter 810 includes a first Ta gasket 805 and a second Ta gasket 855. In some embodiments, the target droplet generator 115 includes a piezoelectric transducer (PZT) 880 around a nozzle tube 900.

As shown in FIG. 2, the nozzle tube 900 is configured to guide flow of target droplets from the source material filter 810 of the droplet generator in accordance with an embodiment of the present disclosure. In some embodiments, the nozzle tube 900 is provided inside the nozzle 117 and located between the source material filter 810 and a nozzle tip 890 of the droplet generator 115. The nozzle tube 900 extends in a direction of a travel path of the target droplets. In some embodiments, the nozzle tube 900 is a capillary tube that extends from the source material filter 810 to the nozzle tip 890. In various embodiments, the nozzle tube 900 is formed of a material which does not react with either the material of the target droplets (e.g., tin), such as a quartz. Other Examples of materials that can be used for the nozzle tube 900 include, but are not limited to a ceramic, molybdenum, or a stainless steel.

Figure 3:
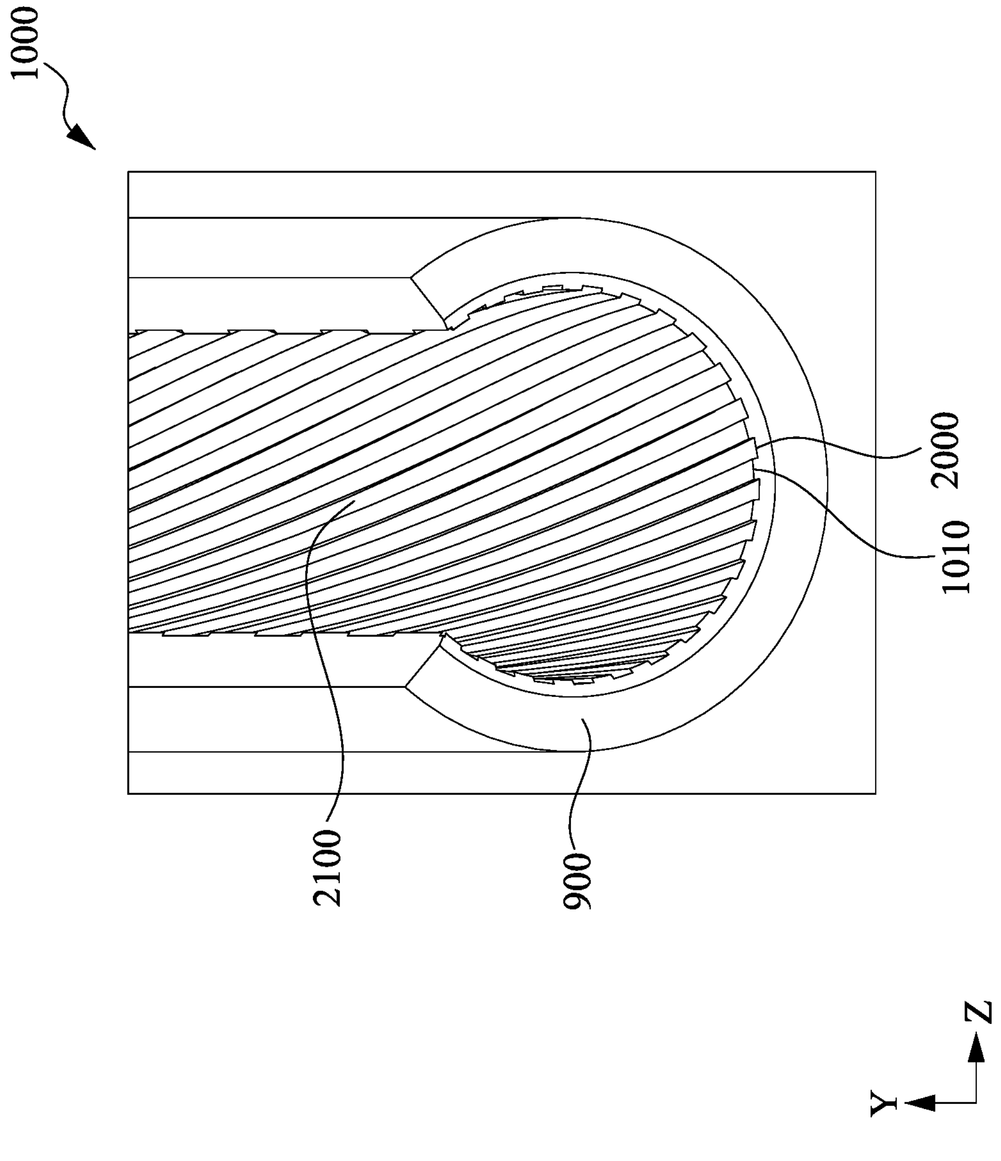
FIG. 3 schematically illustrates a structured nozzle tube including a structured nozzle pattern in accordance with some embodiments of the present disclosure.

As shown in FIG. 3, a structured nozzle tube 1000 includes groove patterns 2000 formed in the nozzle tube 900 disclosed in accordance with some embodiments of the present disclosure. In certain embodiments, the groove patterns 2000 include a helical groove 2100 formed in the inner surface 1010 of the nozzle tube 900.

Figure 4B:
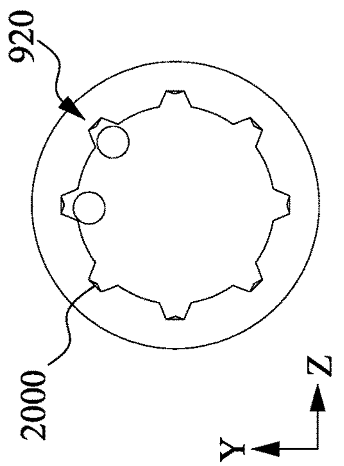
FIGS. 4A, 4B and 4C schematically illustrate the groove patterns of the structured nozzle pattern in accordance with some embodiments of the present disclosure.
Figure 4A:
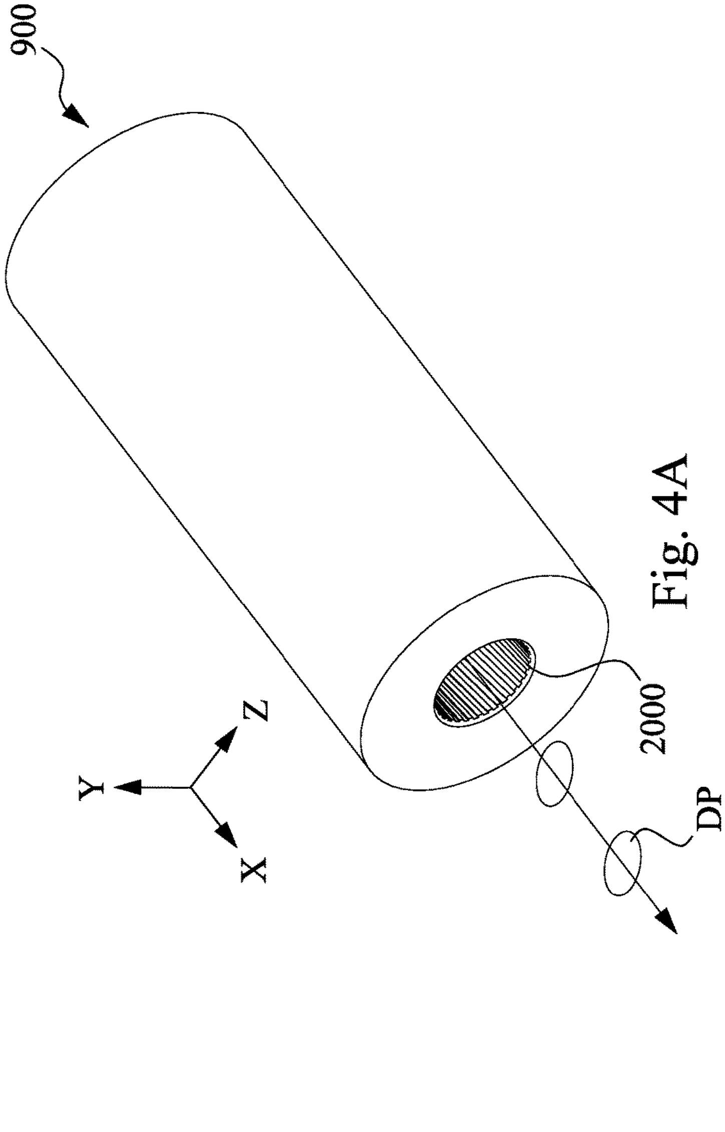
Figure 4C:
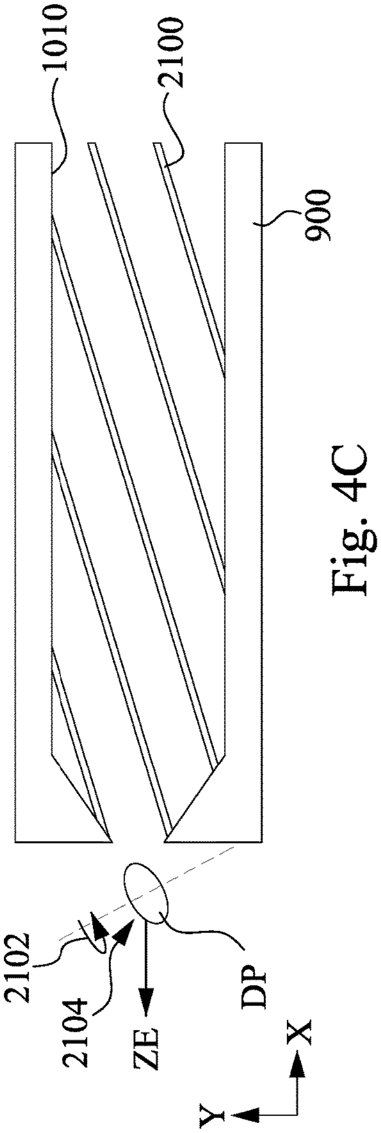

FIGS. 4A-4C schematically illustrate the groove patterns 2000 of the structured nozzle pattern in accordance with some embodiments of the present disclosure. FIG. 4A is an isometric view of the nozzle tube 900 that includes the groove patterns 2000 where the target droplets DP are ejected through the nozzle tube 900 in various embodiments. FIG. 4B is a cross sectional view of the Y-Z plane and FIG. 4C is a cross sectional view of the X-Y plane.

As shown in FIG. 4B, in some embodiments, bubbles and/or contaminant particles 920 inside the nozzle tube 900 can be removed by the groove patterns 2000, because the groove patterns 2000 provide more contact area between the bubbles and/or contaminant particles 920 and the inner surface of the nozzle tube than a smooth inner surface. The groove patterns 2000 make it easier to break the bubbles and/or contaminant particles 920 into smaller pieces. As a result, the groove patterns 2000 can prevent the bubbles and/or contaminant particles from being discharged from the nozzle tube, resulting in less accumulation of the tin (Sn) particles on various surfaces including the collector mirror. Further, the amount of plasma is increased resulting in a reduced dose error during the lithography exposure.

As shown in FIG. 4C, in some embodiments, the groove patterns include the helical groove 2100 formed in the inner surface 1010 of the nozzle tube 900. The helical groove 2100 is configured to provide an angular momentum 2102 to the target droplets. When an exerting torque is provided to the target droplet, the helical groove 2100 causes a rotation of the target droplet along a longitudinal axis of the nozzle tube, which provides gyroscopic stability to the target droplet DP by maintaining the angular momentum, thereby improving the target droplet aerodynamic stability against a vessel flow disturbance and accuracy along the travel to the zone of excitation ZE.

Moreover, the rotation of the target droplet caused by the helical groove 2100 allows the target droplet DP in a pancake shape 2104 to form and to expand to an optimal size and geometry, which is subsequently heated (or reheated) by the excitation laser pulses. When a high-power laser beam of the LPP based EUV source is focused on small tin droplet targets to form highly ionized plasma that emits EUV radiation, the intensity of the emitted EUV radiation depends on the effectiveness of the LPP based EUV radiation source. The target droplet in the pancake shape 2104 requires less energy/power consumed by the laser pulses due to the low-density target droplet in the pancake shape 2104. Availability of a steady stream of pancake shaped target droplets improves the stability of the EUV generation and the conversion efficiency by reducing the carbon dioxide ($CO_2$) laser power of the LPP based EUV radiation source. Compared with the nozzle tube with the smooth inner surface design, the structured nozzle 2000 improves the stability of the EUV generation and the carbon dioxide ($CO_2$) conversion efficiency of the EUV radiation source.

Figure 5:
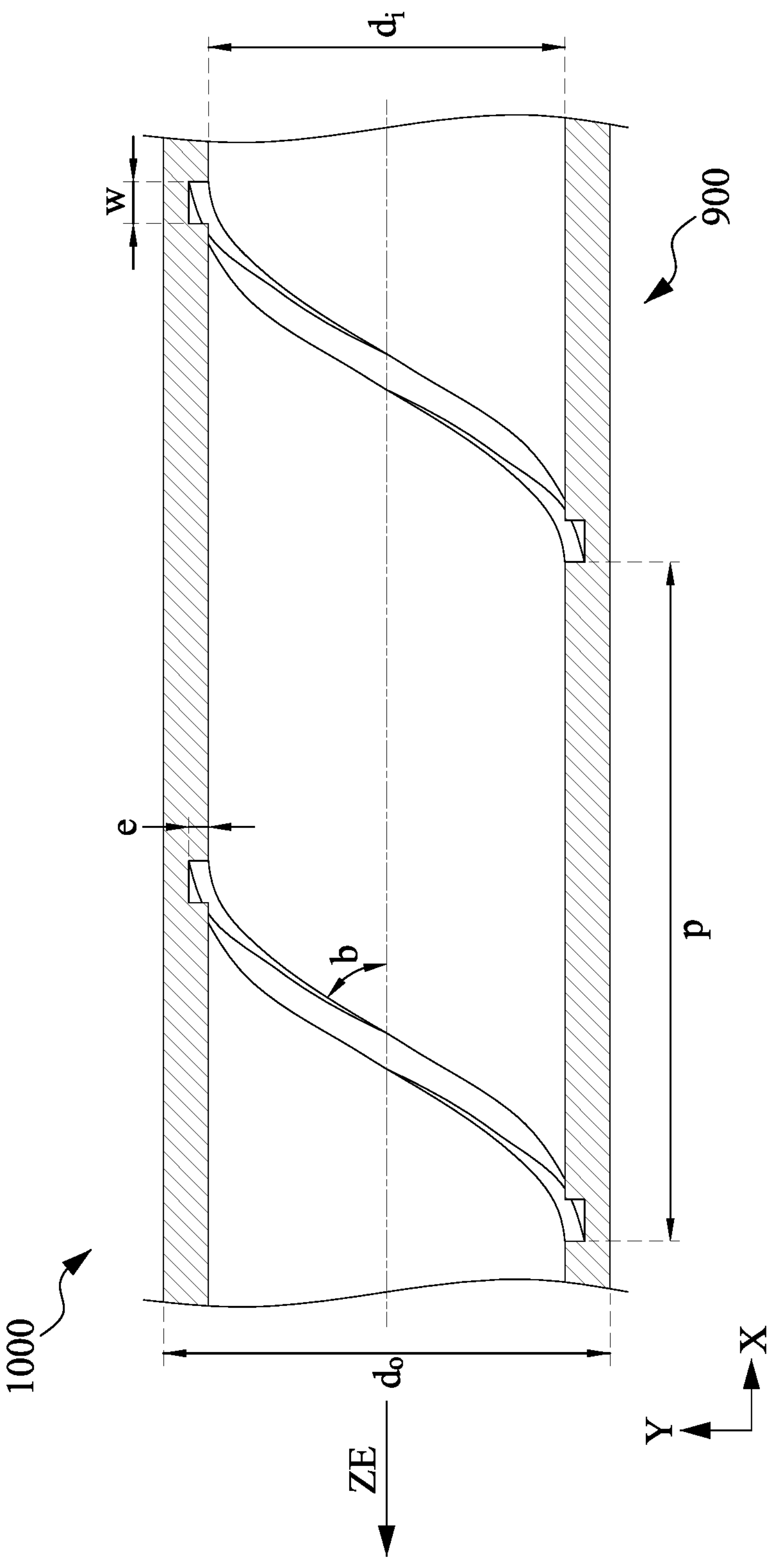
FIG. 5 illustrates a longitudinal cross-sectional view of an example of the structured nozzle tube.

FIG. 5 illustrates a longitudinal cross-sectional view of exemplary of the structured nozzle tube 1000 in accordance with an embodiment of the present disclosure. As shown in FIG. 5, the structured nozzle tube 1000 includes helical groove parameters that includes one or more of a groove width (w), a groove depth (e), an inner diameter di, a pitch length (p), and a helix angle (b) in an internally helically grooved tube that define the twisting torque applied to the target droplet. In some embodiments, based on the measurement of the helical groove parameters of the structured nozzle tube 1000, performance of the structured nozzle tube 1000 are compared and analyzed. In other embodiments, friction and flow characteristics are analyzed based on the measurement of the helical groove parameters of the structured nozzle tube 1000.

In some embodiments, the groove width (w) of the structured nozzle tube is in a range from about 1% to about 99% of the inner diameter di of the structured nozzle tube 1000, is in a range from about 5% to about 50% of the inner diameter in other embodiments, or is in a range from about 10% to about 25% of the inner diameter in certain embodiments. In some embodiments, the groove depth (e) of the structured nozzle tube is in a range from about 1% to about 99% of the inner diameter di of the structured nozzle tube 1000, is in a range from about 5% to about 50% of the inner diameter in other embodiments, or is in a range from about 10% to about 25% of the inner diameter in certain embodiments. In an alternative embodiment, the inner diameter di of the structured nozzle tube 1000 is in a range from about 0.1 μm to about 10 μmm and is in a range from about 1.0 μm to about 5.0 μm in other embodiments. In some embodiments, the groove width (w) of the structured nozzle tube is in a range from about 0.1 μm to about 50 μm, and is in a range from about 1.0 μm to about 5.0 μm in other embodiments. In other embodiments, the groove depth (e) of the structured nozzle tube is in a range from about 0.1 μm to about 50 μm and is in a range from about 1.0 μm to about 5.0 μm in other embodiments. In some embodiments, the pitch length (p) of the structured nozzle tube is in a range from about 0.1 times to about 10 times of the inner diameter di of the structured nozzle tube 1000 and is in a range from about 1 time (the same) to about 5 times in other embodiments. In some embodiments, the helix angle (b) of the structured nozzle tube is in a range from about 0 degree to about 90 degrees, is in a range from about 15 degrees to about 75 degrees in other embodiments, and is in a range from about 30 degrees to about 60 degrees in certain embodiments.

In some embodiments, the groove patterns 2000 include a groove pitch length (p) to determine a twist torque as the target droplet is propelled through the nozzle tube. In some embodiments, the pitch length (p) is in an inversely proportional relationship with the twist torque. A shorter pitch length provides a "faster" twist torque allowing a higher rotating/spin rate to the target droplet for a given velocity. Alternatively, the helix angle (b) is in a proportional relationship with a twist torque. A higher helix angle (b) provides a "faster" twist torque allowing a higher rotating/spin rate to the target droplet for a given velocity.

Figure 6A:
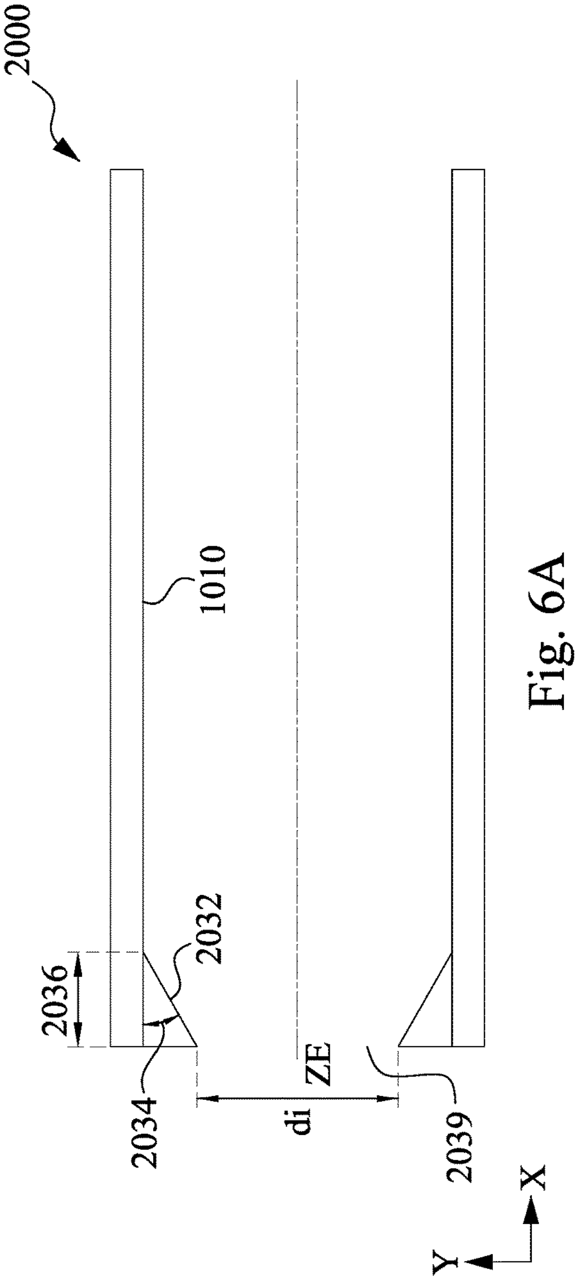
FIGS. 6A and 6B illustrate a longitudinal cross-sectional view of another example of the structured nozzle tube.
Figure 6B:
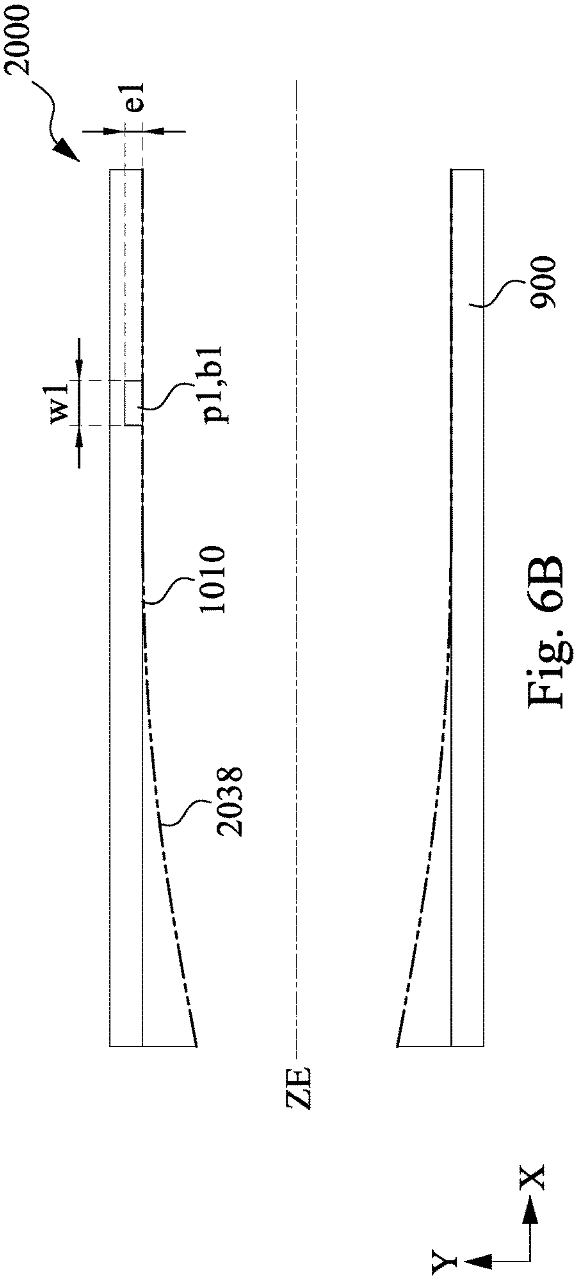

FIGS. 6A and 6B illustrate a longitudinal cross-sectional view of the X-Y plane for another exemplary of the structured nozzle tube 1000 in accordance with an embodiment of the present disclosure. The longitudinal cross-section of the structured nozzle tube 1000 is not particularly limited.

As shown in FIG. 6A, in some embodiments, the structured nozzle tube 1000 has a cross-section area that reduces distally in the direction towards a nozzle exit 2039 (or the zone of excitation ZE). In other words, the structured nozzle tube 1000 has longitudinally tapered inner portion 2032. In some embodiments, the tapered inner portion 2032 disposed at an end of the nozzle tube provides stability to the target droplet by maintaining the twist torque, thereby improving its aerodynamic stability and accuracy along the travel to the zone of excitation ZE. In some embodiments, the tapered inner portion 2032 is defined by a taper angle 2034 with respect to the inner surface 1010 and a taper width 2036 to determine the inner diameter di of the structured nozzle tube 1000. In some embodiments, the taper angle 2034 of the structured nozzle tube is in a range from about 0 degree to about 90 degrees, and is in a range from about 5 degrees about 30 degrees other embodiments. In some embodiments, the structured nozzle tube 1000 has the inner diameter di of the structured nozzle tube 1000 in a range of about 1.5 μm to about 3 μm. In some embodiments, the structured nozzle tube 1000 has the outer diameter do in a range of about 0.8 mm to about 1.2 mm (about 800 μm to about 1200 μm).

As shown in FIG. 6B, in some embodiments, the pitch length (p) changes along an X axis of the nozzle tube 900 in the direction towards the nozzle exit (or the zone of excitation ZE), generating an adjusted pitch (p1, similar to p shown in FIG. 5) of a longitudinal groove profile 2038. The longitudinal groove profile 2038 is defined along the inner surface 1010 and is configured to change the twist torque as the target droplet is propelled through the nozzle tube 900 and improve its aerodynamic stability and accuracy along the travel to the zone of excitation ZE.

In some alternative embodiments, the helix angle (b, shown in FIG. 5) is adjusted along the X axis of the nozzle tube 900 to provide a desired twist torque through the nozzle tube. A combination of the helix angles (b) provides the desired twist torque to impart a desired rotating/spin rate to the target droplet for a given velocity.

In some embodiments, at least one of the groove width (w) and the groove depth (e) changes along an X axis of the nozzle tube 900 in the direction towards the nozzle exit (or the zone of excitation ZE), generating an adjusted groove width (w1) and an adjusted groove depth (e1) of the longitudinal groove profile 2038. The temperature may affect the performance of the groove patterns that determines the twist torque as the target droplet is propelled through the nozzle tube. The adjusted groove width (w1) and/or the adjusted groove depth (e1) may be designed along the inner surface 1010 to provide for aerodynamic stability at a given temperature, thereby obtaining a desired twist torque through the nozzle tube. A combination of the groove width and the groove depth provides the desired twist torque allowing the desired rotating/spin rate to the target droplet for a given velocity and a given temperature.

FIGS. 7A-7F schematically illustrate various cross-sectional views (projected views) of the groove patterns 2000 in the Y-Z plane of the structured nozzle tube 1000 according to various embodiments of the present disclosure.

Figure 7A:
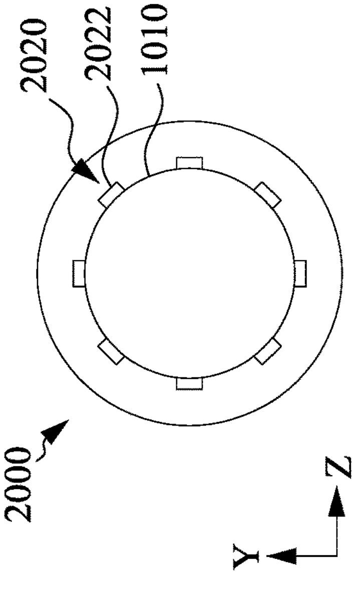
FIGS. 7A, 7B, 7C, 7D, 7E, 7F, 7G, 7H, and 7I schematically illustrate various cross-sectional views of the groove patterns of the structured nozzle tube according to various embodiments of the present disclosure.
Figure 7B:
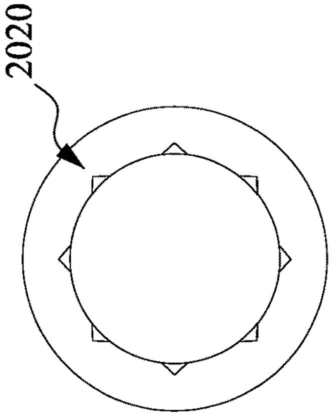
Figure 7C:
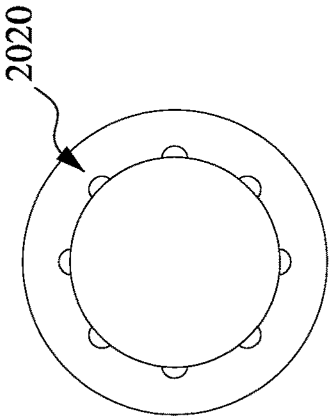
Figure 7D:
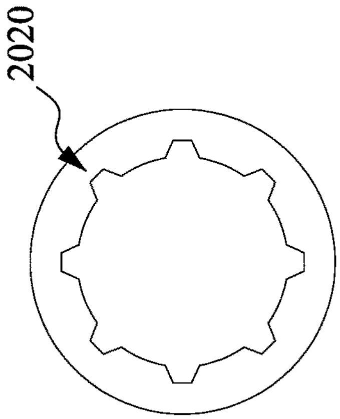
Figure 7E:
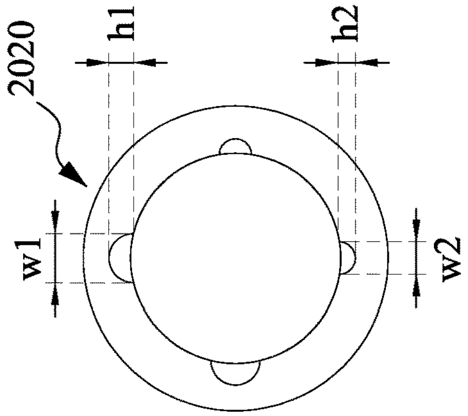

As shown in FIGS. 7A-7E, in some embodiments, the groove patterns 2000 includes the groove shape 2020 along the inner surface 1010 with a cross-sectional groove profile 2022 such that the groove shape 2020 of the inner surface 1010 allows the droplet pass through the inner surface 1010 with the desired twist torque. In some embodiments, the cross-sectional groove profile 2022 includes at least one selected from the rectangular or square (shown in FIG. 7A), triangular (shown in FIG. 7B), partially (e.g., half) circular or ellipse (shown in FIG. 7C), trapezoidal (shown in FIG. 7D), or a regular or irregular (where heights h1 and h2 and/or widths w1 and w2 of the groove shape 2020 are different as shown in FIG. 7E) convex polygon shaped cross-sectional profile. However, it should be understood that these are merely exemplary embodiments and that the present system may apply to any cross-sectional profiles without any limitation. For the sake of brevity of the present disclosure, not every example is included, but the present application contemplates any such embodiments.

Figure 7G:
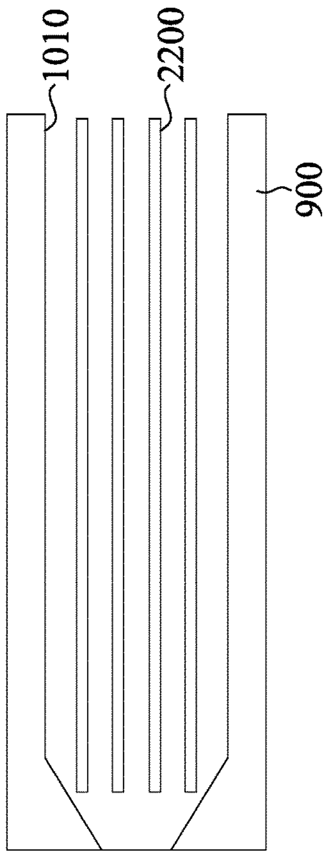
Figure 7I:
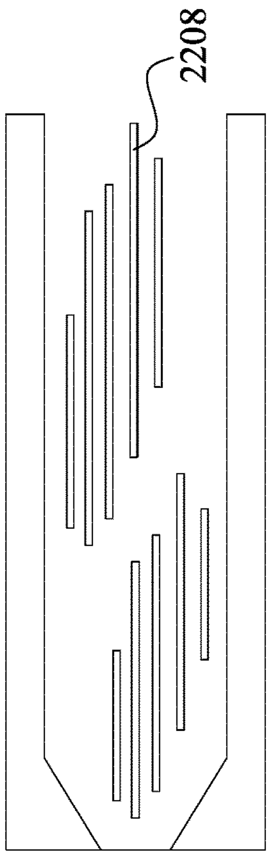
Figure 7F:
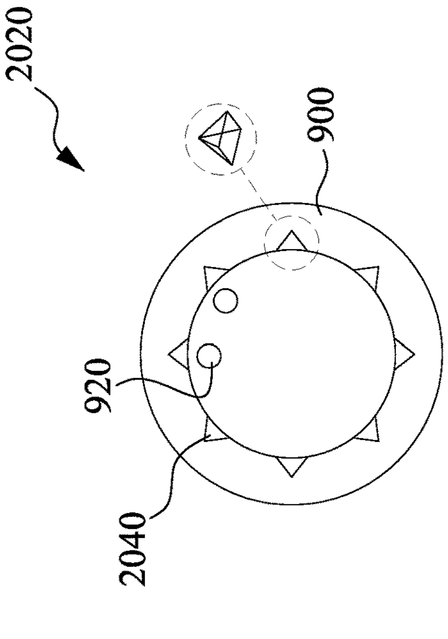
Figure 7H:
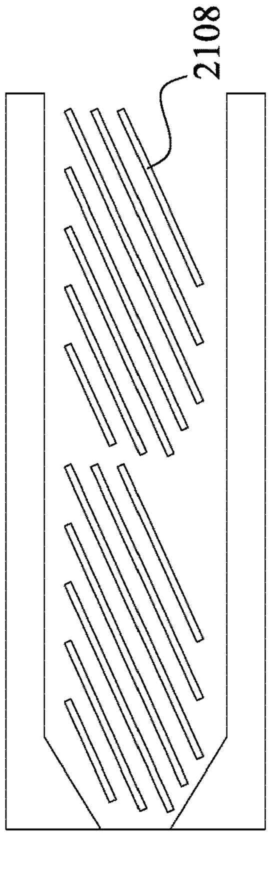

FIGS. 7G-7I schematically illustrate various cross-sectional views (projected views) of the groove patterns 2000 in the X-Y plane of the structured nozzle tube 1000 according to various embodiments of the present disclosure.

In some embodiments, the structured nozzle pattern includes surface patterns, such as projections and/or grooves, along an inner surface of the nozzle tube to break bubbles or contaminant particles from the nozzle tube. As shown in FIG. 7F, in some embodiments, because the groove patterns 2000 provide sharp-angled grooves 2040, such as a pyramid shape in 3-dimension, between the bubbles and/or contaminant particles 920 and the inner surface of the nozzle tube, bubbles and/or contaminant particles inside the nozzle tube 900 can be more efficiently removed by the groove patterns 2000. The sharp-angled grooves 2040 improves the efficacy of breaking the bubbles and/or contaminant particles 920 into smaller pieces. As a consequence, the groove patterns 2000 including the sharp-angled grooves 2040 prevent the bubbles and/or contaminant particles from being discharged much effectively from the nozzle tube, and thus, results in less accumulation of the tin (Sn) particles on various surfaces, such as the collector mirror.

In some embodiments, the groove patterns 2000 are formed as the helical groove (2100 shown in FIG. 3) in the inner surface of the nozzle tube. In an alternative embodiment, as shown in FIG. 7G, the groove patterns 2000 are formed as a straight groove formed in the inner surface 1010 of the nozzle tube 900. As shown in FIG. 8H, in some embodiments, the groove patterns are formed as discontinuous helical grooves 2108 compared to continuous helical grooves shown in FIG. 4C on the inner surface of the nozzle tube. As shown in FIG. 71, in some embodiments, the groove patterns are formed as discontinuous straight grooves 2208 compared to continuous straight grooves shown in FIG. 7G on the inner surface of the nozzle tube. In some embodiments, the discontinuous helical grooves 2108 and discontinuous straight grooves 2208 include at least one of regularly or irregularly discontinued grooves or projections.

In some embodiments, additional parameters are considered in the design and investigation of the structured nozzle pattern including different roughness, roughness width, and geometric shape of the roughness, spacing, and number of helical grooves.

Figure 8:
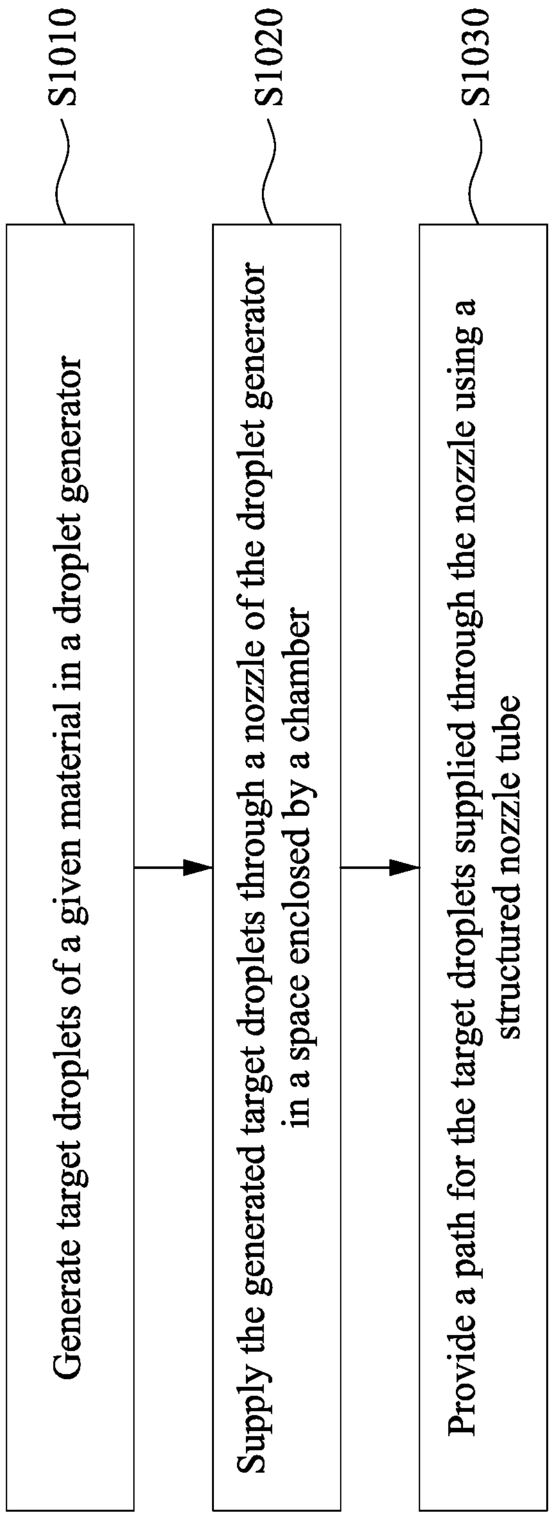
FIG. 8 illustrates a flow-chart for a method of producing target droplets for generating laser produced plasma in an EUV radiation source, in accordance with an embodiment of the present disclosure.

FIG. 8 illustrates a flow-chart for a method of producing target droplets for generating laser produced plasma in an EUV radiation source, in accordance with an embodiment of the present disclosure. In some embodiments, the method includes, at S1010, generating target droplets of a given source material in a droplet generator. In various embodiments, the material of the target droplets are one of tin, lithium or an alloy of tin and lithium.

The method further includes, at S1020, supplying the generated target droplets through a nozzle of the droplet generator in a space enclosed by a chamber. In some embodiments, the nozzle of the target droplet is maintained at a temperature higher than the melting point of the source material.

The method further includes, at S1030, providing an enclosed path for the target droplets supplied through the nozzle using a structured nozzle tube configured to provide an angular momentum to the target droplet. In some embodiments, the structured nozzle pattern includes groove patterns along an inner surface of the nozzle tube to provide aerodynamic stability against a vessel flow disturbance and accuracy along the travel to a zone of excitation. In some embodiments, the structured nozzle pattern includes surface patterns along an inner surface of the nozzle tube to break bubbles or contaminant particles from the nozzle tube.

In some embodiments, the method further includes determining the structured nozzle pattern based on measurements of helical groove parameters that include one or more of a groove width (w), a groove depth (e), an inner diameter di, an outer diameter do, a pitch length (p), and a helix angle (b) in an internally helically grooved tube.

In other embodiments, the method further includes measuring characteristics of the target droplets including one or more selected from the group consisting of a velocity of the target droplets, a distance between successive target droplets, a frequency of the target droplets, a radius of the target droplets and a shape of the target droplets By using a structured nozzle tube configured to provide angular momentum to the target droplet, a characteristic of the target droplets along the path provided by the structured nozzle pattern is substantially unaffected by a variation of the environment within the chamber. As used herein, the term “substantially unaffected” refers to a situation where a given characteristic of a given target droplet does not deviate more than about 10% from its designed value. Examples of characteristics of the target droplet include, without limitation, a velocity of the target droplets, a distance between successive target droplets, a frequency of the target droplets, a radius of the target droplets, a shape of the target droplets, or any combination thereof. A variation of environment within the chamber, in various embodiments, includes, but is not limited to, a change in: a pressure inside the EUV generation chamber, a temperature inside the EUV generation chamber, a flow rate of gas inside the EUV generation chamber, a local pressure at a portion of the space enclosed by the EUV generation chamber, or any combination thereof.

In some embodiments, the method further includes determining the structured nozzle pattern based on analysis of measured helical groove parameters and performance of the structured nozzle tube that allows the pancake shaped target droplet to form to an optimal size and geometry.

It will be understood that not all advantages have been necessarily discussed herein, no particular advantage is required for all embodiments or examples, and other embodiments or examples may offer different advantages.

In the present disclosure, by providing a path for target droplets traveling from a nozzle of a target droplet generator to a zone of excitation through a structured nozzle tube, the effect of plasma and buffer gas flow on the size, shape and travel path of the target droplets can be reduced. Therefore, the quality of target droplets arriving at the zone of excitation is improved, and in turn, the performance of the EUV radiation source is improved. Additionally, collector contamination caused by target droplet instability or by leakage of source material from the target droplet generator can be reduced.

An embodiment of the disclosure is an extreme ultraviolet (EUV) radiation source that includes an EUV generation chamber enclosing a space, a droplet generator, and an excitation laser. The droplet generator is configured to generate target droplets of a given material. The droplet generator includes a nozzle configured to supply the target droplets in the space enclosed by the EUV generation chamber. The excitation laser is configured to heat the target droplets supplied by the nozzle to generate plasma, in which the excitation laser is focused at a focal position in the space enclosed by the EUV generation chamber. A nozzle tube is arranged within the nozzle of the droplet generator, and the nozzle tube includes a structured nozzle pattern configured to provide an angular momentum to the target droplets.

In some embodiments, the structured nozzle pattern includes groove patterns along an inner surface of the nozzle tube. In some embodiments, the groove patterns include a helical groove configured to provide the angular momentum to the target droplet. In some embodiments, the structured nozzle pattern includes a tapered inner portion disposed at an end of the nozzle tube configured to provide stability to the target droplet. In some embodiments, an adjusted pitch of the nozzle tube is included along an axis in a direction towards a nozzle exit. In some embodiments, the structured nozzle pattern includes a cross-section having a shape selected from the group consisting of a circle, an ellipse, a triangle, a trapezoid, and a regular or irregular convex polygon. In some embodiments, the discontinuous helical grooves is included on the inner surface of the nozzle tube. In some embodiments, the groove patterns further includes a straight groove formed in the inner surface of the nozzle tube.

Another embodiment of the disclosure is a target droplet source for an extreme ultraviolet (EUV) source that includes a droplet generator and a structured nozzle tube. The droplet generator is configured to generate target droplets of a given material, in which the droplet generator includes a nozzle configured to supply the target droplets in a space enclosed by a chamber. The structured nozzle tube has an inner surface comprising at least one of a groove or a projection configured to break bubbles or contaminant particles into smaller pieces.

In some embodiments, the structured nozzle tube includes a helical groove that allows the target droplet in a pancake shape to form and to expand to an optimal size and geometry. In some embodiments, the helical groove includes control parameters that include one or more of a groove width (w), a groove depth (e), an inner diameter di, an outer diameter do, a pitch length (p), and a helix angle (b) in an internally helically grooved tubes. In some embodiments, the structured nozzle tube includes groove patterns including sharp-angled grooves. In some embodiments, the sharp-angled grooves includes a pyramid shape in 3-dimension. In some embodiments, the groove patterns include discontinuous grooves on the inner surface of the nozzle tube. In some embodiments, the structured nozzle tube includes groove patterns that include a cross-section having a shape selected from the group consisting of a circle, an ellipse, a triangle, a trapezoid, and a regular or irregular convex polygon. In some embodiments, the structured nozzle tube is made of quartz.

According to another aspect of the present disclosure, another embodiment is a method of producing target droplets for generating laser produced plasma in an extreme ultraviolet (EUV) radiation source. The method includes generating target droplets of a given material in a droplet generator. Then, the generated target droplets is supplied through a nozzle of the droplet generator in a space enclosed by a chamber. When an exerting torque is provided to the target droplet, an angular momentum is provided to the target droplets supplied through the nozzle using a structured nozzle tube with a structured nozzle pattern.

In some embodiments, an inner portion at an end of the nozzle tube is tapered. In some embodiments, the nozzle tubs includes a longitudinal groove pitch that changes a twist torque as the target droplet gets propelled through the nozzle tube. In some embodiments, the structured nozzle tube includes groove patterns that include a cross-section having a shape selected from the group consisting of a circle, an ellipse, a triangle, a trapezoid, and a regular or irregular convex polygon.

The foregoing outlines features of several embodiments or examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments or examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An extreme ultraviolet (EUV) radiation source comprising:

an EUV generation chamber enclosing a space; and a droplet generator configured to generate target droplets of a given material, the droplet generator comprising a nozzle configured to supply the target droplets in the space, wherein:

the nozzle comprises a nozzle having a structured nozzle pattern configured to provide an angular momentum to the target droplets.

2. The EUV radiation source of claim 1, wherein the structured nozzle pattern includes groove patterns along an inner surface of the nozzle tube.

3. The EUV radiation source of claim 2, wherein the groove patterns include a helical groove configured to provide the angular momentum to the target droplets.

4. The EUV radiation source of claim 2, further including discontinuous helical grooves on the inner surface of the nozzle tube.

5. The EUV radiation source of claim 2, further including a straight groove formed in the inner surface of the nozzle tube.

6. The EUV radiation source of claim 1, wherein the structured nozzle pattern includes a tapered inner portion disposed at an end of the nozzle tube configured to provide stability to the target droplets.

7. The EUV radiation source of claim 1, wherein the structured nozzle pattern includes a cross-section having a shape selected from the group consisting of a circle, an ellipse, a triangle, a trapezoid, and a regular or irregular convex polygon.

8. A droplet generator configured to generate target droplets of a given material for an extreme ultraviolet (EUV) source, comprising:

a structured nozzle tube having an inner surface comprising at least one of a groove or a projection, wherein the structured nozzle tube is made of quartz.

9. The droplet generator of claim 8, wherein the structured nozzle tube includes a helical groove.

10. The droplet generator of claim 8, wherein the structured nozzle tube includes groove patterns including sharp-angled grooves.

11. The droplet generator of claim 10, wherein the sharp-angled grooves include a pyramid shape in 3-dimension.

12. The droplet generator of claim 10, wherein the groove patterns include discontinuous grooves on the inner surface of the structured nozzle tube.

13. The droplet generator of claim 8, wherein the structured nozzle tube includes groove patterns that include a cross-section having a shape selected from the group consisting of a circle, an ellipse, a triangle, a trapezoid, and a regular or irregular convex polygon.

14. The droplet generator of claim 8, wherein the structured nozzle tube has an inner diameter of 1.5 μm to 3 μm.

15. The droplet generator of claim 8, wherein an inside of the structured nozzle tube is tapered.

16. The droplet generator of claim 15, wherein a taper angle is from 5 degrees to 30 degrees.

17. A method of producing target droplets for generating laser produced plasma in an extreme ultraviolet (EUV) radiation source, the method comprising:

generating target droplets of a given material by a droplet generator, wherein an angular momentum is provided to the target droplets.

18. The method of claim 17, wherein the angular momentum is provided by a structured nozzle tube with a structured nozzle pattern in the droplet generator.

19. The method of claim 18, wherein the structured nozzle tube includes a longitudinal groove pitch that changes a twist torque as the target droplets get propelled through the structured nozzle tube.

20. The method of claim 18, wherein the structured nozzle tube includes groove patterns that include a cross-section having a shape selected from the group consisting of a circle, an ellipse, a triangle, a trapezoid, and a regular or irregular convex polygon.

* * * * *